US006453336B1

(12) United States Patent
Beyda et al.

(10) Patent No.: US 6,453,336 B1
(45) Date of Patent: Sep. 17, 2002

(54) VIDEO CONFERENCING WITH ADAPTIVE CLIENT-CONTROLLED RESOURCE UTILIZATION

(75) Inventors: William Joseph Beyda, Cupertino; Shmuel Shaffer, Palo Alto; Vinesh R. Mehta, Mountain View, all of CA (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/152,872

(22) Filed: Sep. 14, 1998

(51) Int. Cl.[7] .................. G06F 15/16; G06F 15/173
(52) U.S. Cl. ........................ 709/204; 709/224
(58) Field of Search ................. 709/204, 205; 370/260; 707/201

(56) References Cited

U.S. PATENT DOCUMENTS

| | | | | |
|---|---|---|---|---|
| 5,410,698 A | * | 4/1995 | Dannels et al. | 395/650 |
| 5,689,641 A | * | 11/1997 | Ludwig et al. | 395/200.02 |
| 5,825,858 A | * | 10/1998 | Shaffer et al. | 379/120 |
| 5,887,170 A | * | 3/1999 | Ansberry et al. | 395/687 |
| 5,889,549 A | * | 3/1999 | Yasuda et al. | 348/14 |
| 5,953,049 A | * | 9/1999 | Horn et al. | 348/15 |
| 5,995,155 A | * | 11/1999 | Schindler et al. | 348/461 |
| 5,995,491 A | * | 11/1999 | Richter et al. | 370/263 |
| 6,005,563 A | * | 12/1999 | White et al. | 345/327 |
| 6,006,253 A | * | 12/1999 | Kumar et al. | 709/204 |
| 6,014,693 A | * | 1/2000 | Ito et al. | 709/219 |
| 6,014,706 A | * | 1/2000 | Cannon et al. | 709/231 |
| 6,026,097 A | * | 2/2000 | Voois et al. | 370/468 |
| 6,049,549 A | * | 4/2000 | Ganz et al. | 370/449 |

OTHER PUBLICATIONS

ITU–T Recommendation H.323 Packet–based multimedia communications systems, COM 16–54–E. 1997.
RADVision's "H.323 Building Blocks", TeleCon XVII, Anaheim California, 1997.
Intel Corporation, "Measuring Quality in Videoconferencing Systems", Nov. 1997.
Intel Corporation, "multipoint conferencing information", "http://www.intel.com/proshare/conferencing/deploy/multi.htm".
Intel Corporation, "ProShare Conferencing Video System 200" PC Magazine: Desktop Videoconferencing, "http://www.zdnet.com/pcmag/features/vidconf/rev2.htm".
Bolot et al., Scalable Feedback Control for Multicast Video Dictribution in the Internet., ACM Sigcomm 94 pp. 58–66 (9), Aug. 1994.*

* cited by examiner

Primary Examiner—Robert B. Harrell
Assistant Examiner—Bunjob Jaroenchonwanit (57) ABSTRACT

Techniques to dynamically control the allocation of resources between audio and video (and perhaps data) streams of a video conference are disclosed. By providing the dynamic control, a participant to a video conference is able to alter the quality levels for the audio and video (and perhaps data) streams that they receive while the video conference is ongoing. A tool bar, window or the like can be used to enable a participant to dynamically control the quality levels. The techniques are particularly well suited for personal computer based video conferencing.

36 Claims, 7 Drawing Sheets

VIDEO CONFERENCING WITH ADAPTIVE CLIENT-CONTROLLED RESOURCE UTILIZATION

BACKGROUND OF THE INVENTION

1. Field of the Invention

The present invention relates to video conferencing, and more particularly, to resource allocation for video conferencing.

2. Description of the Related Art

Video conferencing has been utilized for many years. However, in recent years, video conferencing from a computer terminal or through a computer network has become feasible. The computer terminal is, for example, a personal computer having a camera and a microphone. The computer network can be a Local Area Network (LAN), a Public System Telephone Network (PSTN), or the Internet. Video conferencing requires a large amount of bandwidth and often quality levels of audio, video and data are not able to be maintained at high levels due to limitations on bandwidth. The limitation on bandwidth can come from the computer network or the computer terminals.

Current video conferencing standards, particularly those that used packetized data for transmission (e.g. IP, Ethernet), separate a conference into separate streams for audio, video and data. Two standards that pertain to video conferencing are: (1) ITU-T Recommendation H.320 (1996) Narrow-band visual telephone systems and terminal equipment and (2) ITU-T Recommendation H.323 (1997) Packet-based multimedia communications systems, and both of which are hereby incorporated by reference.

Various algorithms have been used to allocated varying amounts of bandwidth to audio versus video. However, these conventional algorithms all operate under the assumption that audio is more important than video, and thus when bandwidth is in short supply video quality is sacrificed to maintain a certain minimal level of audio quality. In severe cases, the video stream can even be completely dropped.

One problem is that audio is presumed to be more important than video. However, often times video is more important than audio, and in such cases, the conventional approaches are not appropriate. For example, if a participant to a video conference is hearing impaired, they will likely desire to lip read from the participant of the video conference that is talking. Hence, for the hearing impaired person, high quality video is needed and audio quality is not important. Another example of a situation where video is more important than audio is where a participant is trying to read text or other detailed objects of a video image of the video conference. In such a case, the participant may want to temporarily obtain high quality video while sacrificing audio quality, which would enable the participant to read the text or other detailed objects from the video. With severe loss in bandwidth, the conventional approaches might even drop the video stream altogether (and display a notification screen or a skill image) and continue with the audio stream.

Another problem with the conventional algorithms is that the user cannot participate in the allocation of bandwidth between audio and video. Hence, conventionally speaking, a participant would not be able to alter the bandwidth allocation during the video conference. At best, a participant could set some preference levels only during the initial call setup of the video conference.

Thus, there is a need for improved approaches to allocated bandwidth for video conferencing.

SUMMARY OF THE INVENTION

Broadly speaking, the invention relates to techniques to dynamically control the allocation of resources between audio and video (and perhaps data) streams of a video conference. By providing the dynamic control, a participant to a video conference is able to alter the quality levels for the audio and video (and perhaps data) streams that they receive while the video conference is ongoing. The invention is particularly well suited for personal computer based video conferencing.

The invention can be implemented in numerous ways, including as a method, an apparatus, a computer readable medium, and a computer system. Several embodiments of the invention are discussed below.

As a method for providing a video conference, an embodiment of the invention includes the acts of: initiating a video conference having an audio quality level and a video quality level, the video conference using resources to provide audio and video between two stations coupled together by a network; displaying a quality level adjustment tool that allows a participant to adjust at least one of the audio quality level and the video quality level as the video conference is ongoing; receiving, from the quality level adjustment tool, an adjustment request to modify at least one of the audio quality level and the video quality level; and adjusting at least one of the audio quality level and the video quality level in accordance with the adjustment amount.

As a method for providing a video conference, another embodiment of the invention includes the operations of: initiating a video conference having an audio quality level and a video quality level, the video conference providing audio and video between two stations coupled together by a network; monitoring a conference quality level for the video conference as the video conference is ongoing; determining if a loss of quality for the video conference has been detected or anticipated; displaying a request for a quality level adjustment when the determining determines that a loss of quality has been detected or anticipated; receiving an adjustment request to modify at least one of the audio quality level and the video quality level; and adjusting at least one of the audio quality level and the video quality level in accordance with the adjustment amount.

As a method for providing a video conference, still another embodiment of the invention includes the acts of: initiating a video conference having an audio quality level and a video quality level, the video conference using resources to provide audio and video between two stations coupled together by a network; monitoring available resources for the video conference as the video conference is ongoing; determining if a reduction of the available resources for the video conference has been detected or anticipated; displaying a request for a quality level adjustment when the determining determines that a reduction of the available resources has been detected or anticipated; receiving, in response to the request being displayed, an adjustment request to modify at least one of the audio quality level and the video quality level; and adjusting at least one of the audio quality level and the video quality level in accordance with the adjustment request.

As method for providing a video conference using a conference server, an embodiment of the invention includes: receiving incoming streams of audio and video from stations participating in the video conference, the incoming streams having incoming quality levels; receiving requested quality levels from the stations participating in the video conference; processing the incoming streams to produce outgoing streams in accordance with the requested quality levels; and transmitting the outgoing streams to the stations participating in the video conference. The requested quality levels from the stations can be received dynamically as the video conference is ongoing. Optionally, one of the stations can be instructed to reduce the quality of one or more of its transmitted streams.

As a computer readable medium including computer program code for providing a video conference, an embodiment of the invention includes: computer program code for initiating a video conference having an audio quality level and a video quality level, the video conference using resources to provide audio and video between two stations coupled together by a network; computer program code for displaying a quality level adjustment tool that allows a participant to adjust at least one of the audio quality level and the video quality level as the video conference is ongoing; computer program code for receiving, from the quality level adjustment tool, an adjustment request to modify at least one of the audio quality level and the video quality level; and computer program code for adjusting at least one of the audio quality level and the video quality level in accordance with the adjustment amount.

As a computer readable medium including computer program code for providing a video conference using a conference server, an embodiment of the invention includes: computer program code for receiving incoming streams of audio and video from stations participating in the video conference, the incoming streams having incoming quality levels; computer program code for receiving requested quality levels from the stations participating in the video conference; computer program code for processing the incoming streams to produce outgoing streams in accordance with the requested quality levels;.and computer program code for transmitting the outgoing streams to the stations participating in the video conference. The reception of the requested quality levels from the stations can occur dynamically as the video conference is ongoing.

As a computer system for supporting a video conference with a remote computer system through a network, an embodiment of the computer system includes: a camera for receiving local images; a display for displaying remote images from a remote computer system participating in the video conference; a microphone for picking up local audio; a speaker for reproducing remote audio from the remote computer system participating in the video conference; and a video controller that controls the transmission of the local video and the local audio as well as the reception of the remote video and the remote audio. More particularly, the video controller operates to (1) initiate the video conference having an audio quality level and a video quality level, (2) display a quality level adjustment tool that allows a participant to adjust at least one of the audio quality level and the video quality level as the video conference is ongoing, (3) receive, from the quality level adjustment tool, an adjustment request to modify at least one of the audio quality level and the video quality level; and (4) adjust at least one of the audio quality level and the video quality level in accordance with the adjustment amount.

The advantages of the invention are numerous. One advantage of the invention is that a participant to a video conference is able to prefer video over audio such that when resources are limited audio quality is sacrificed to preserve video quality. Another advantage of the invention is that a participant to a video conference is able to control the allocation of resources (e.g., bandwidth) to audio, video and perhaps data streams associated with the video conference in a real-time manner while the video conference is in progress.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to techniques to dynamically control the allocation of resources between audio and video (and perhaps data) streams of a video conference. By providing the dynamic control, a participant to a video conference is able to alter the quality levels for the audio and video (and perhaps data) streams that they receive while the video conference is ongoing. A tool bar, window or the like can be used to enable a participant to dynamically control the quality levels. The invention is particularly well suited for personal computer based video conferencing.

Embodiments of this aspect the invention are discussed below with reference to FIGS. 1–7. However, those skilled in the art will readily appreciate that the detailed description given herein with respect to these figures is for explanatory purposes as the invention extends beyond these limited embodiments.

Figure 1:
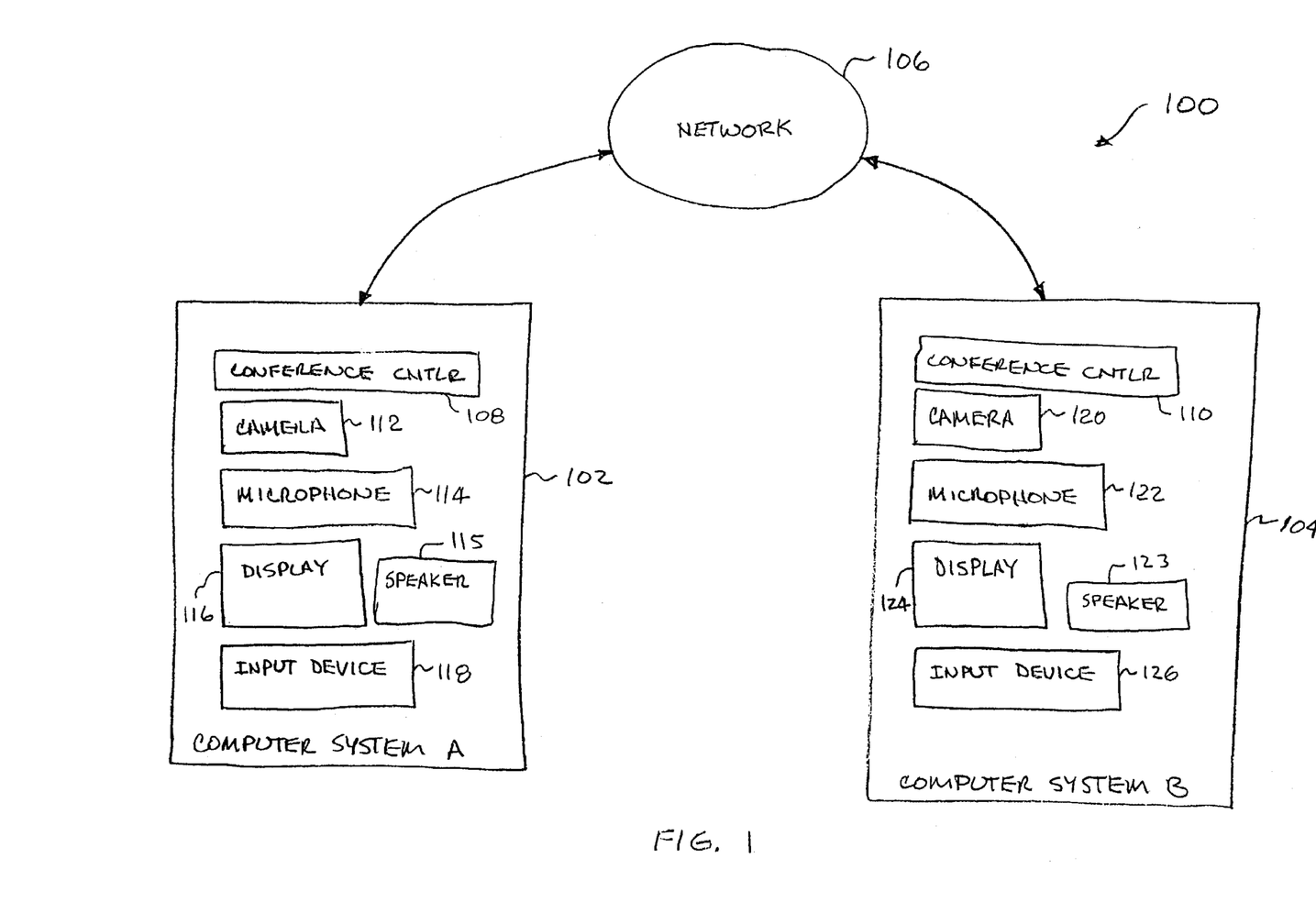
FIG. 1 is a block diagram of a video conferencing system according to an embodiment of the invention.

FIG. 1 is a block diagram of a video conferencing system 100 according to an embodiment of the invention. The video conferencing system 100 includes a computer system A 102 and a computer system B 104. The computer system A 102 is coupled to the computer system B 104 through a network 106. The network 106 can include one or more different types of networks, including a public telephone network, a local area network (LAN), a wide area network, or the Internet.

In this exemplary embodiment, it is assumed that there is a video conference between users of the computer system A 102 and the computer system B 104. More generally, the users are participants of the video conference. The video conference is controlled by a conference controller 108 of the computer system A 102 and a conference controller 110 of the computer system B 104. The conference controllers 108 and 110 can be implemented by hardware, software or a combination of both. An example of hardware is a hardware plug-in board that plugs into a mother board of the computer system. An example of software is an video conference application program that is a stand-alone application or a plug-in to a network browser application.

The computer system A 102 also includes a camera 112, a microphone 114, a display 116, and an input device 118. The computer system A 102 uses the camera 112 to obtain video images local to the computer system A 102 during a video conference. The microphone 114 is also used during video conferences to provide audio input local to the computer system A 102. Both the video images from the camera 112 and the audio input from the microphone 114 are supplied to the conference controller 108 and then transmitted to the computer system B 104 over the network 106. Additionally, the computer system A 102 includes a speaker 115 that produces audio sounds. The display 116 is used to display video images and perhaps control mechanisms for the user of the computer system A 102. The conference controller 108 controls the supply of audio inputs to the speaker 115 as well as the display of video images and control mechanisms on the display 116. For example, the display 116 might display images produced by a remotely located camera (e.g., camera 120) that is participating in the video conference, and the speaker 115 might produce audio sounds from a remotely located microphone (microphone 122). The input device 118 can take a variety of forms and is used by a user of the computer system 102 A to provide control inputs or other inputs to the computer system A 102.

The computer system B 104 uses the camera 120 to obtain video images local to the computer system B 104 during a video conference. The microphone 122 is also used during video conferences to provide audio input local to the computer system B 104. Both the video images from the camera 120 and the audio input from the microphone 122 are supplied to the conference controller 110 and then transmitted to the computer system A 102 over the network 106. Additionally, the computer system B 104 includes a speaker 123 that produces audio sounds. The display 124 is used to display video images and perhaps control mechanisms for the user of the computer system A 102. The conference controller 110 controls the supply of audio inputs to the speaker 123 as well as the display of video images and control mechanisms on the display 124. For example, the display 124 might display images produced by a remotely located camera (e.g., camera 112) that is participating in the video conference, and the speaker 123 might produce audio sounds from a remotely located microphone (e.g., microphone 114). The input device 126 can take a variety of forms and is used by a user of the computer system B 104 to provide control inputs or other inputs to the computer system B 104.

As noted above, when a video conference is arranged between the computer system A 102 and the computer system B 104, the conference controllers 108 and 110 exchange the audio-visual information through the network 106. Additionally, certain video conferences also desire to exchange data in addition to audio and video information. In such cases, the conference controllers 108 and 110 as well as the network 106 can be used to transport data between the computer system A 102 and the computer system B 104.

A representative video conference between the computer system A 102 and the computer system B 104 can operate as follows. The cameras 112 and 120 would provide local video pickup and the displays 116 and 124 would provide the video output to the user of the respective computer systems. For example, the video images obtained by the camera 120 of the computer system A 104 would be supplied through the network 106 and displayed on the display 116 of the computer system A 102. Likewise, the video images obtained by the camera 112 of the computer system A 102 would be supplied through the network 106 to the display 124 of the network 106. Further, audio sounds picked up by the microphone 114 of the computer system A 102 would be supplied through the network 106 to the speaker 123 associated with the computer system B 104. Likewise, audio sounds picked up by the microphone 122 of the computer system B 104 would be supplied through the network 106 to the speaker 115 of the computer system A 102.

The input devices 118 and 126 can provide a user's (or conference participant's) input to the respective computer systems 102 and 104, respectively. The type of input being supplied to the input devices 118 and 126 can vary widely, and may include a conference initiating command, a data transfer command, or setting quality levels for the audio, visual and data transfers between the computer systems participating in the video conference.

The video conferencing system 100 is able to dynamically control the allocation of resources between audio and video (and perhaps data) streams of a video conference. For example, if resources become limited after a video conference has begun, then the video conference system 100 operates to request or allow a participant to alter the quality levels for the audio and video (and perhaps data) streams that they receive while the video conference is ongoing. As examples, the bandwidth of the network 106 may become limited, the latency of the network 106 may become unacceptably long due to congestion, or processing resources at a computer system may become over worked. A tool bar, window or the like can be used to enable a participant to dynamically control the quality levels. The ability to dynamically control the relative quality levels of audio, video and data is a significant advantage over conventional approaches that offered the participants no choice. Hence, in nearly real-time, a participant can control the quality levels that it receives audio, video and perhaps data for a video conference. The control over the quality levels can be either in discrete increments or in more of a continuous variation.

Additional details on the operation of video conferences according to the invention are explained below with reference to FIGS. 2–7.

Figure 2:
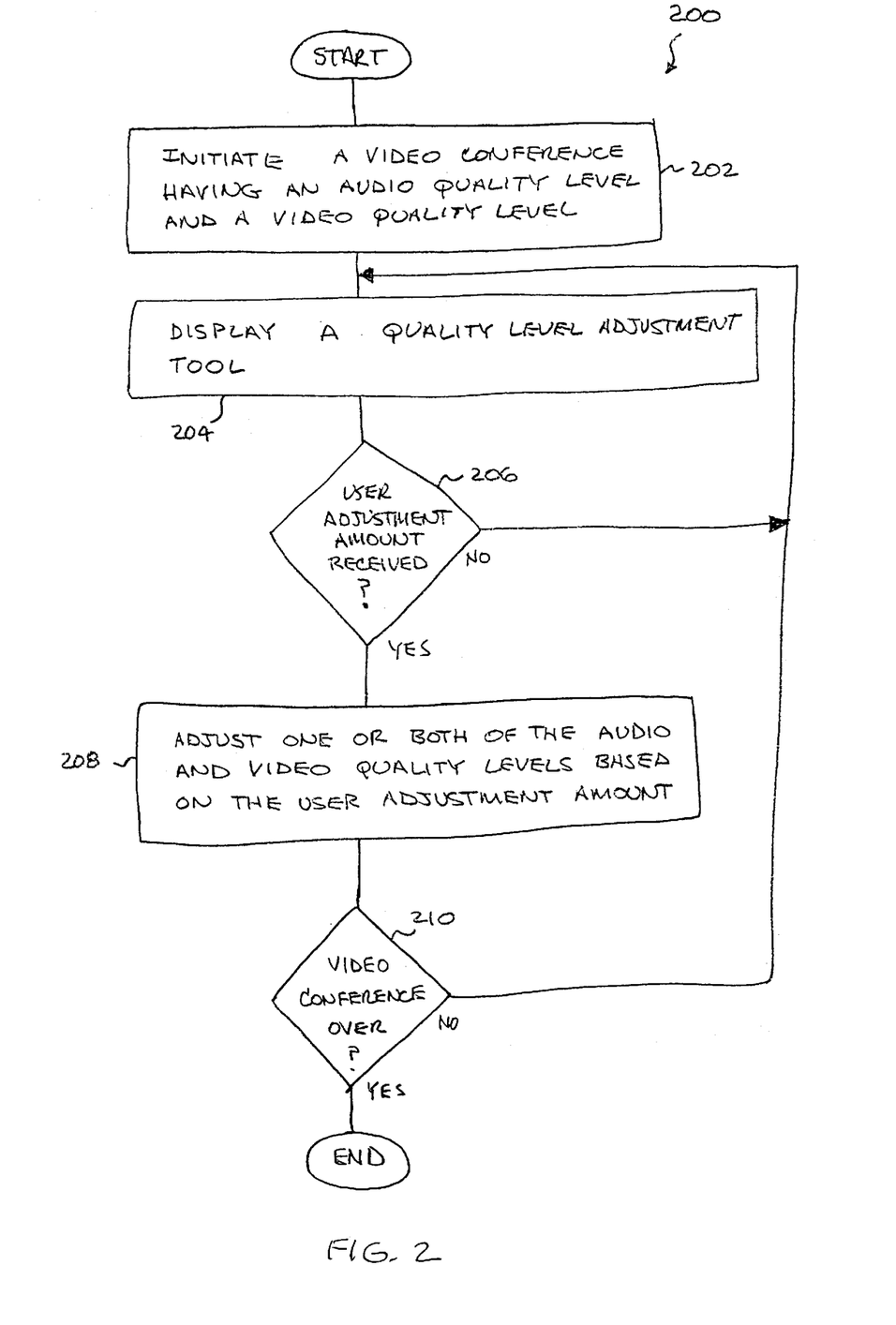
FIG. 2 is a flow diagram of quality controlled video conference processing according to one embodiment of the invention.

FIG. 2 is a flow diagram of quality controlled video conference processing 200 according to one embodiment of the invention. The quality controlled video conference processing 200 is, for example, performed by a video conferencing system such as the video conferencing system 100 illustrated in FIG. 1.

The quality controlled video conference processing 200 initiates 202 a video conference having an audio quality level and a video quality level. The initial audio and video levels can be set in a variety of ways, including by user preferences, by default levels, or by availability of system resources. After the video conference is initiated 202, a quality level adjustment tool is displayed 204. For example, in the case of the computer system A 102, the quality level adjustment tool can be displayed on the display 116 illustrated in FIG. 1. The quality level adjustment tool allows the user to dynamically adjust one or more of the quality levels for the video conference (e.g., audio quality level, video quality level). Using the quality level adjustment tool that is displayed, a user of a computer system participating in the video conference can adjust one or more of the quality levels utilized by the video conference in a dynamic manner, that is, while the video conference is ongoing.

Following block 204, a decision block 206 determines whether a user adjustment amount has been received. The user adjustment amount is an amount by which one or more of the quality levels should be adjusted. The user adjustment amount is obtained by user interaction with the quality level adjustment tool. More particularly, a user interacts with the quality level adjustment tool to determine the user adjustment amount. When the decision block 206 determines that the user adjustment amount has not been received, then the processing will return to repeat block 204 and subsequent blocks until the user adjustment amount is determined to be received.

Once the decision block 206 determines that the user adjustment amount has been received, then one or both of the audio and video quality levels for the video conference are adjusted 208 based on the user adjustment amount. The user adjustment amount can signal the quality controlled video conference processing 200 to raise or lower one or more of the audio quality level and the video quality level.

Next, a decision block 210 determines whether the video conference that was previously initiated 202 is now over (i.e., completed). When the decision block 210 determines that the video conference is over, then the quality controlled video conference processing 200 returns to repeat the block 204 and subsequent blocks. Alternatively, when the decision block 210 determines that the video conference is over, then the quality controlled video conference processing 200 is complete and ends.

Figure 3:
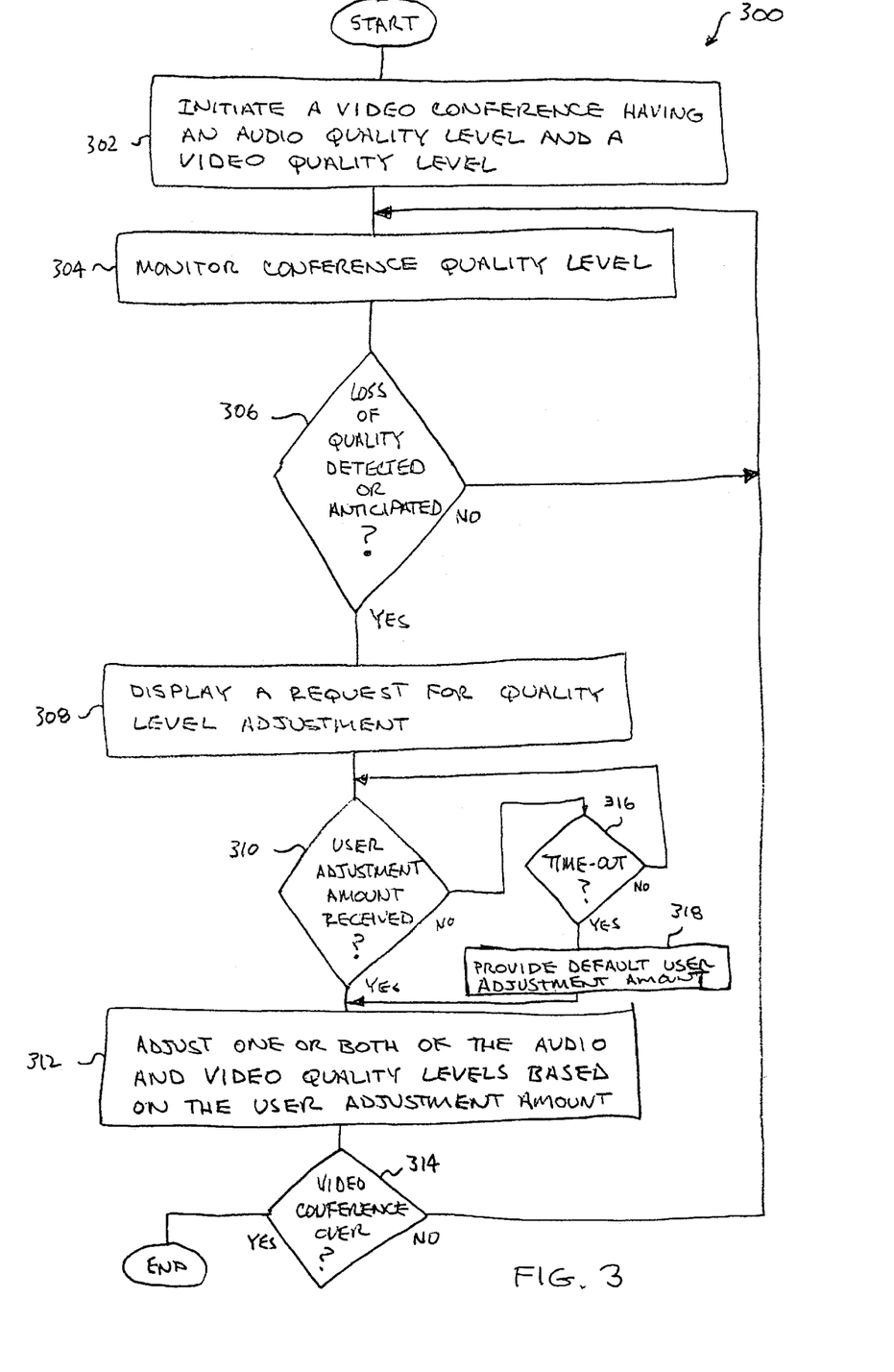
FIG. 3 is a flow diagram of quality controlled video conference processing according to another embodiment of the invention.

FIG. 3 is a flow diagram of quality controlled video conference processing 300 according to another embodiment of the invention. The quality controlled video conference processing 300 is, for example, performed by a video conference system such as the video conferencing system 100 illustrated in FIG. 1 which includes the computer systems 102 and 104. Like the quality controlled video conference processing 200, the quality controlled video conference processing 300 also permits dynamic quality level adjustments while a video conference is ongoing. However, in this embodiment, the quality controlled video conference processing 300 specifically requests a user to make an adjustment to one or more of the quality levels when such adjustments are determined to be needed so as to maintain both the audio and video streams.

The quality controlled video conference processing 300 initially initiates 302 a video conference having an audio quality level and a video quality level. The initial audio and video levels can be set in a variety of ways, including by user preferences, by default levels, or by availability of system resources. Next, the conference quality level is monitored 304. Here, the conference quality level can be monitored in a variety of ways, including monitoring video rates or audio rates actually being provided by the video conference system.

Next, a decision block 306 determines whether a loss of quality is detected or anticipated based on the monitoring of the conference level quality. When the decision block 306 determines that the loss of quality is either detected or anticipated, then the quality controlled video conference processing 300 returns to repeat the block 304 and subsequent blocks.

Once the decision block 306 determines that the loss of quality has been either detected or anticipated, then the quality controlled video conference processing 300 operates to provide adjustments to the audio and video quality levels to accommodate the quality level now supportable by the video conferencing system. Namely, a request for quality level adjustment is displayed 308. Here, as an example, the request for quality level adjustment can be displayed on the display 116 or the display 124 of the computer systems 102 and 104 illustrated in FIG. 1.

Next, a decision block 310 determines whether a user adjustment amount has been received. When the decision block 310 determines that the user adjustment amount has been received, then one or both of the audio and video quality levels is adjusted 312 based on the user adjustment amount. Following block 312, a decision block 314 determines whether the video conference is over (i.e., completed). When the decision block 314 determines that the video conference is not over, then the quality controlled video conference processing 300 returns to repeat the block 304 and subsequent blocks. However, once the decision block 314 determines that the video conference is over, then the quality controlled video conference processing 300 is complete and ends.

Additionally, the quality controlled video conference processing 300 can also include a mechanism to provide default user adjustment amounts in the event that the user does not provide a user adjustment amount within a certain period of time. This allows the video conferencing system to make an appropriate quality level adjustment even when the user is unavailable or not interested in altering the quality levels for the video conference. Hence, when the decision block 310 determines that the user adjustment amount has not yet been received, then a decision block 316 determines whether a time-out condition has occurred. When the decision block 316 determines that a timeout condition has not occurred, then the quality controlled video conference processing 300 returns to repeat the decision block 310 to again check whether a user adjustment amount has been received. On the other hand, when the decision block 316 determines that the time-out has occurred 316, a default user adjustment amount is provided 318. Following block 318, the quality controlled video conference processing 300 returns to the block 312 and subsequent blocks.

Figure 4:
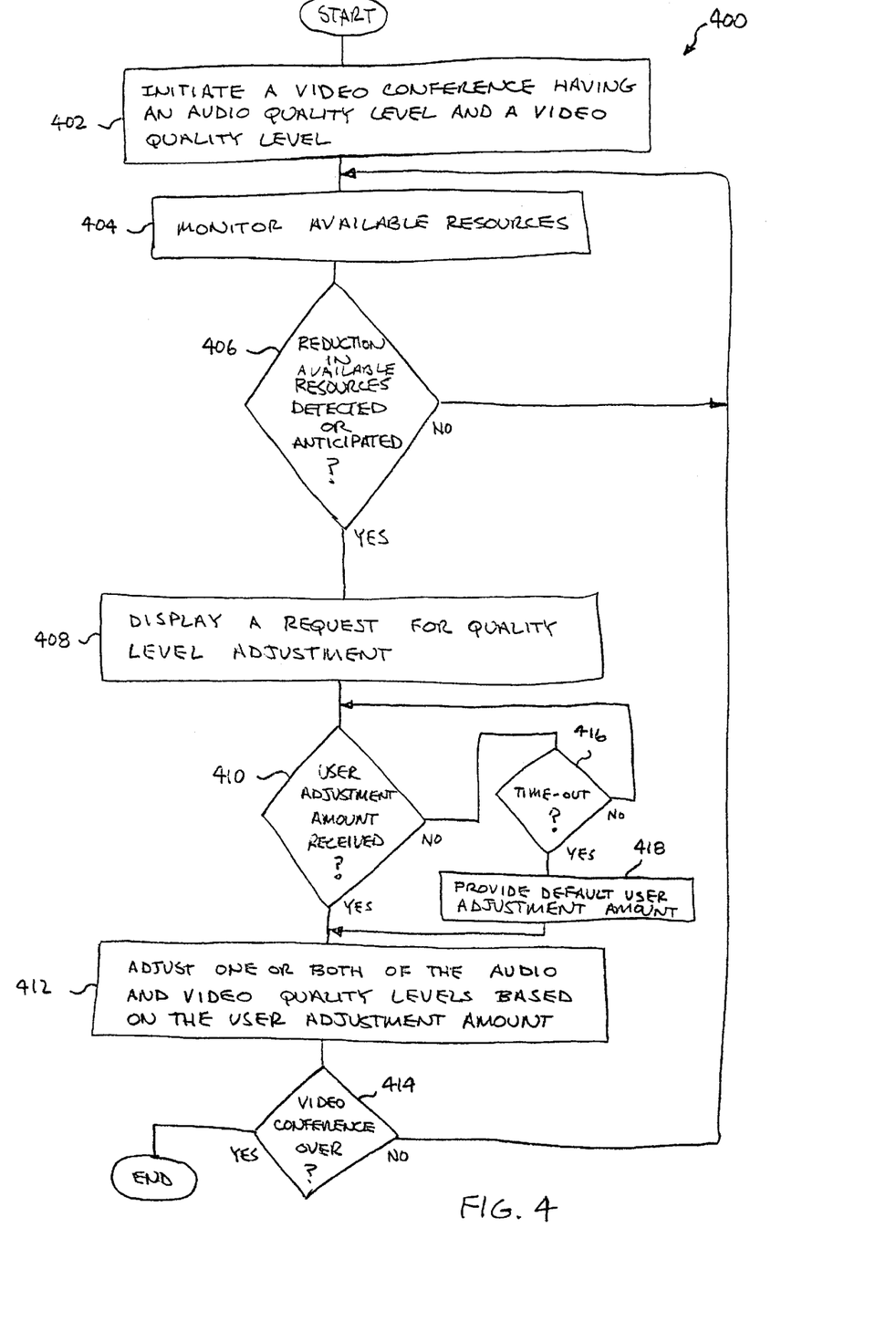
FIG. 4 is a flow diagram of quality controlled video conference processing according to yet another embodiment of the invention.

FIG. 4 is a flow diagram of quality controlled video conference processing 400 according to yet another embodiment of the invention. The quality controlled video conference processing 400 is, for example, performed by the computer systems 102 and 104 illustrated in FIG. 1. Like the quality controlled video conference processing 200, 300, the quality controlled video conference processing 400 also permits dynamic quality level adjustments while a video conference is ongoing. In this embodiment, similar to the quality controlled video conference processing 300, the quality controlled video conference processing 400 specifically requests a user to make an adjustment to one or more of the quality levels when such adjustments are determined to be needed so as to maintain both the audio and video streams. Here, the adjustments to quality levels are determined to be needed by monitoring of network or local resources that are used to support the video conference.

The quality controlled video conference processing 400 initially initiates 402 the video conference having an audio quality level and a video quality level. The initial audio and video levels can be set in a variety of ways, including by user preferences, by default levels, or by availability of system resources. Next, available resources utilized by the video conference are monitored 404. The available resources can include, for example, processing resources associated with the computer system, network bandwidth, network congestion, network latency, and the like. The network bandwidth, the network congestion, the network latency are normally determined by interaction with the network supporting the video conference. The processing resources associated with the computer system are determined by the computer system and include, for example, available Central Processing Unit (CPU) resources or Digital Signal Processing (DSP) resources. By monitoring the available resources while the video conference is ongoing, the quality controlled video conference processing 400 is able to evaluate whether or not the available resources are sufficient to support the audio quality level and the video quality level that have been previously established for the video conference. Normally, the resources that are initially available to the video conference system are normally at least sufficient to provide the audio quality level and the video quality level that were initially used for the video conference.

A decision block 406 determines whether a reduction in available resources has been detected or anticipated. When the decision block 406 determines that there has not been a significant reduction in available resources, then the quality controlled video conference processing 400 returns to repeat the block 404 and subsequent blocks.

On the other hand, when the decision block 406 determines that there has been a significant reduction in the available resource or that such a reduction is anticipated to occur imminently, then the quality controlled video conference processing 400 operates to perform operations so as to alter the quality levels of the video conference in a user-controlled manner. The processing for such a situation is as follows. Once the decision block 406 determines that there has been a significant reduction in the available resources (either presently or anticipated to occur in the near future), a request for quality level adjustment is displayed 408. The request for the quality level adjustment is displayed on a display such as the display 116 of the computer system A 102 or the display 124 of the computer system B 104. The request for the quality level adjustment is thus presented to a user of a computer system by being displayed thereon. In response to the request for the quality level adjustment, a user of the appropriate computer system (or a local participant of the video conference) may or may not enter a user adjustment amount. When the user does enter an adjustment amount, then a decision block 410 determines that a user adjustment amount has been received. In such case, one or both of the audio and video quality levels is adjusted 412 based on the user adjustment amount. Next, a decision block 414 determines whether the video conference is over (i.e., completed). When the video conference is over, the quality controlled video conference processing 400 is complete and ends. Alternatively, when the decision block 414 determines that the video conference is not over, then the quality controlled video conference processing 400 returns to repeat the block 404 and subsequent blocks.

Additionally, when the decision block 410 determines that a user adjustment amount has not been received, then a decision block 416 determines whether a time-out has occurred due to the delay in a user entering a user adjustment amount. When the decision block 416 determines that a time-out has not occurred, then the processing returns to repeat the decision block 410 and subsequent blocks so that the user has a predetermined time period to enter the user adjustment amount. On the other hand, once the decision block 416 determines that the time-out has occurred, then a default user adjustment amount is provided 418. The default user adjustment amount are used in place of a previously used user adjustment amount in the case in which a user does not enter a user adjustment amount. Following the block 418, the quality controlled video conference processing 400 performs the block 412 and subsequent blocks.

Although the quality controlled video conference processing 200, 300 and 400 discussed above was described with reference to video and audio quality levels, it should be understood that any of the above embodiment can also utilize and control a data quality level associated with data transfers associated with the video conference. It is common for a video conference to support audio, video and data. Data transfer for video conferences is, for example, suitable for document transfers or whiteboards.

Figure 5A:
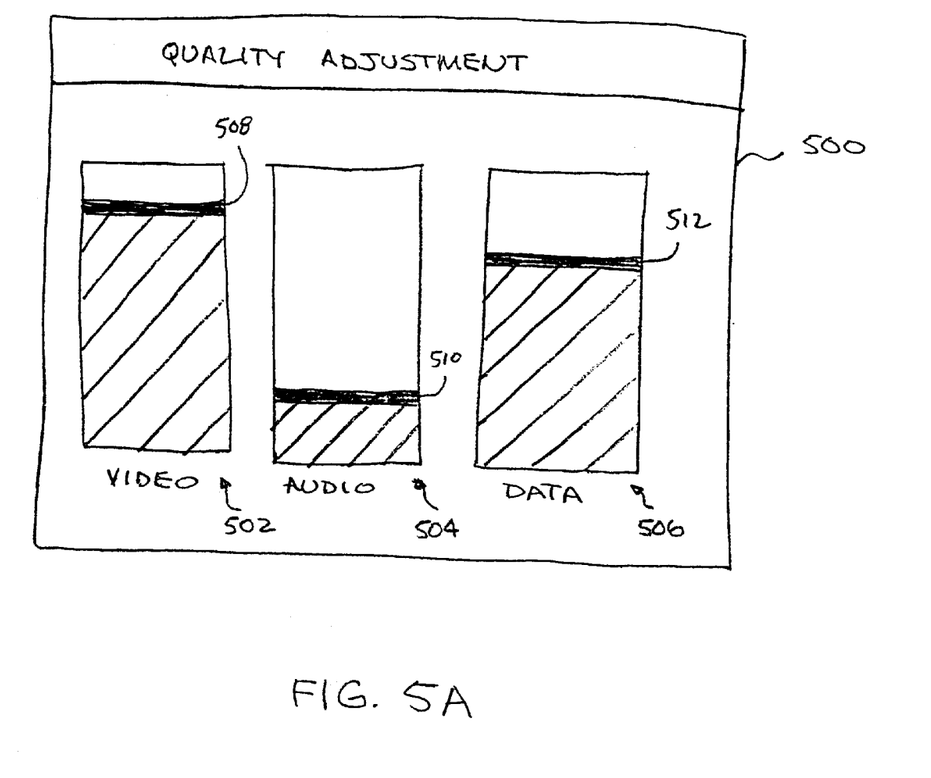
FIG. 5A is a pictorial diagram of a exemplary quality level adjustment window according to an embodiment of the invention.

FIG. 5A is a pictorial diagram of an exemplary quality level adjustment window 500 according to an embodiment of the invention. The quality level adjustment window 500 is suitable for making quality adjustments to video, audio and data that are associated with an ongoing video conference. The quality level adjustment window 500 is one type of quality level adjustment tool.

The quality level adjustment window 500 includes a video rate control 502, an audio rate control 504, and a data rate control 506. A user can adjust the rates of the video, audio and data by a variety of difference means. In the case of the quality level adjustment window 500, the rate levels of the outer rectangular boxes are associated with the maximum rates, whereas the hatched regions indicate that proportion of the maximum rate at which the transmissions are requested to take place. For example, the video rate control 502 indicates that the current rate is approximately 90% of the maximum potential rate for video conferencing. Similarly, the audio rate control 504 indicates that the audio rate is approximately 20% of its maximum rate. Also, the data rate control 506 indicates that the data rate to be utilized is about 75% of its maximum rate. The user is able to adjust the current rate to new rates by selectively dragging and dropping level bar 508, 510 and 512 for the video rate control 502, the audio rate control 504 and the data rate control 506, respectively. The drag and drop mechanism is performed with a pointer device (e.g., a computer mouse) as is well know in the art.

The levels made available by the video rate control 502, the audio rate control 504, and the data rate control 506 can by continuously varying but are often in somewhat discrete industry standard increments. For example, the video rates could be 28.8 kbps, 64 kbps, 128 kbps, 256 kbps, 384 kbps, 509 kbps, 637 kbps, 765 kbps, 893 kbps, 1.021 Mbps, 1.149 Mbps, 1.277 Mbps, 1.405 Mbps, and 1.533 Mbps. As examples, the audio rates could be 4 kbps, 8 kbps, 12 kbps, 14 kbps, 16 kbps, 20 kbps, . . . , 64 kbps. As examples, the data rates could be 2.4 kbps, 4.8 kbps, 9.6 kbps, 14.4 kbps, 28.8 kbps, 64 kbps, 128 kbps, and 256 kbps.

Figure 5B:
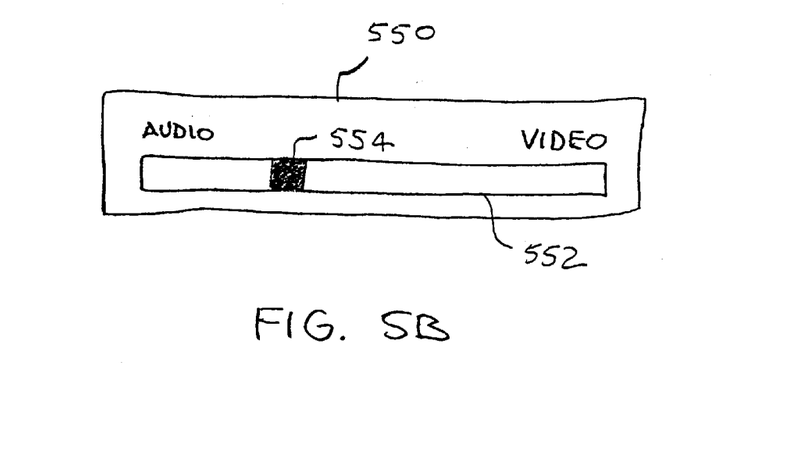
FIG. 5B is a pictorial diagram of an exemplary quality level adjustment window according to another embodiment of the invention.

FIG. 5B is a pictorial diagram of an exemplary quality level adjustment window 550 according to another embodiment of the invention. The quality level adjustment window 550 is suitable for making quality adjustments to video and audio that are associated with an ongoing video conference. The quality level adjustment window 550 is one type of quality level adjustment tool.

The quality level adjustment window 550 includes a slider control 552 in which a user is able to change the mixture of audio and video with a single control. Namely, a user can drag a bar 554 within the slider control 552 to set a level of resource allocation between audio and video. For example, the position of the bar 554 illustrated in FIG. 5B shows that the user is interested in receiving both audio and video but has some preference towards audio (as the bar 554 is closer to the audio side than the video side). Hence, in the case of a shortage of resources, the system would sacrifice some video quality to maintain a reasonable audio quality level.

Many forms of quality level adjustment tools can be utilized. The quality level adjustment windows 500 and 550 are just two of many possible types of quality level adjustment tools that can be utilized with the invention.

Figure 6:
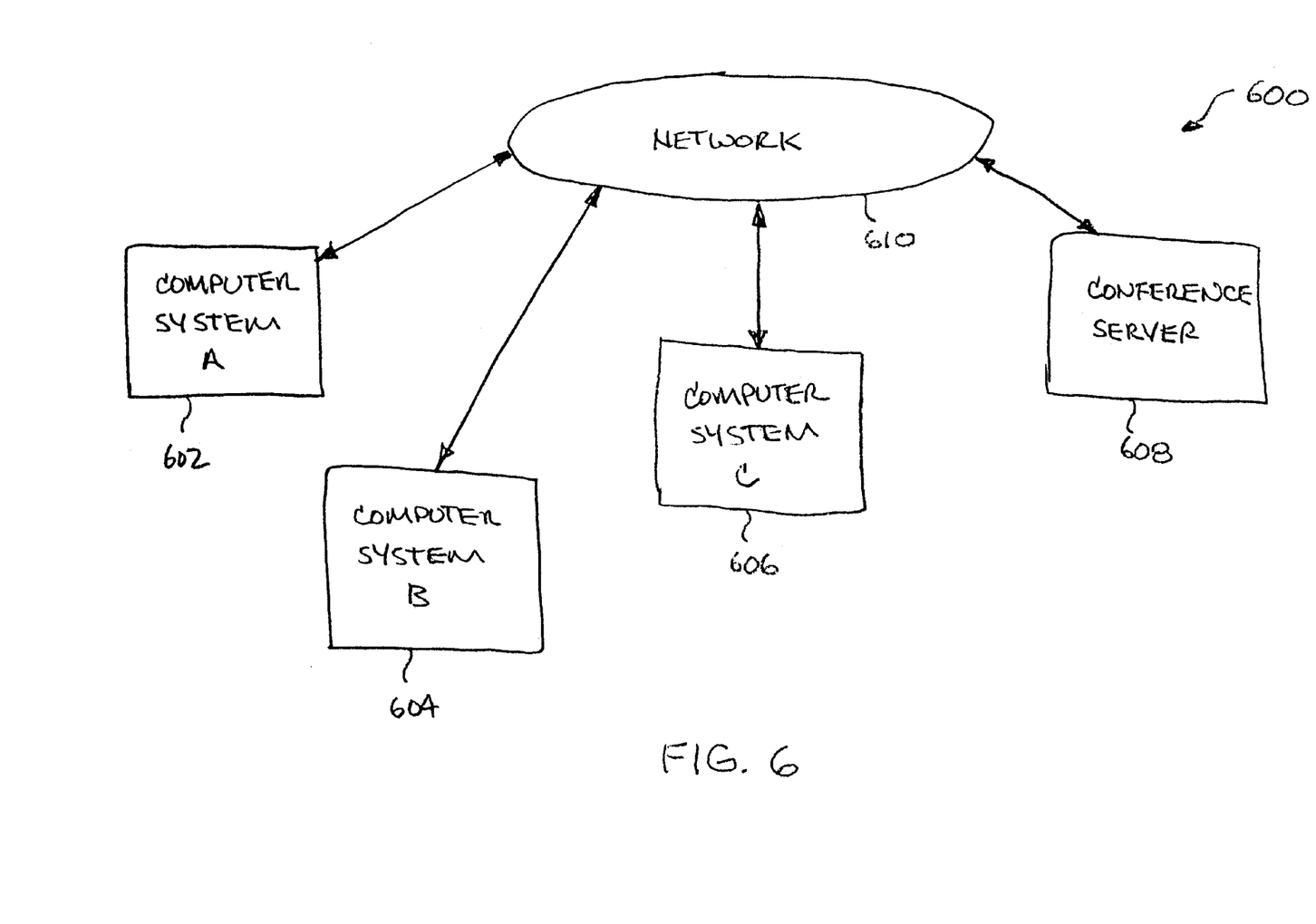
FIG. 6 is a block diagram of a multiple party conference system.

FIG. 6 is a block diagram of a multiple party conference system 600. The multi-party conference system 600 includes a computer system A 602, a computer system B 604, a computer system C 606, a conference server 608 and a network 610.

The computer systems 602–606 can be constructed in a variety of ways, including as illustrated in FIG. 1. The conference server 608 can be referred to as a multiple conference unit (MCU). The conference server 608 operates to collate audio, visual and possibly data from each of the computer systems 602–606 and provide outgoing conference audio, visual and data streams to each of the computer systems 602–606.

The conference server 608 connects to all the participating stations (computer systems 602–606) in a point-to-point fashion through the network 610. The stations transmit control, audio, video and data to the conference server 608. The conference server 608 centrally manages the video conference and processes incoming streams of audio, video and data, and then supplies processed outgoing streams of audio, video and data to the stations.

In processing the incoming streams, the conference server 608 can arbitrate among competing bandwidth demands at the various stations participating in the video conference. For example, assume there is a video conference in which there are three participating stations (computer systems A, B and C). Assume also that each station is initially transmitting a 64 kbps audio stream and 128 kbps video stream to the conference server 608. As is known in the art, each station would be sent the video stream for whichever person is talking. If a user of the computer system A 602 is talking, the conference server 608 receives the 64 kbps audio and 128 kbps video from the computer system A 602. The conference server 608 produces a combined audio stream and selects the video stream from the computer system A, and then forwards the combined audio stream and the selected video stream to the various stations participating in the video conference.

Assume also that later into the video conference, the user of the computer system B 604 requests 32 kbps audio and 64 kbps video as its quality rates or levels, while user of the computer system C 606 requests 64 kbps audio and 64 kbps video. To accommodate these dynamic adjustments of the quality levels or rates during the video conference, the conference server 608 needs to be able to dynamically alter its processing (e.g., rate or format conversions) and the streams it provides to the various stations. In such a case, each of the stations can receive the streams having the quality levels it is requesting. Namely, in this example, the computer system B 604 receives 32 kbps audio and 64 kbps video while the computer system C 606 receives 64 kbps audio and 64 kbps video. As a result, each station is able to dynamically adjust the quality levels or rates during the video conference to make better use of available resources. Conventionally, this could only be performed during the initial setup of the video conference. Here, it is able to occur dynamically during the video conference (i.e., real-time adjustments).

Additionally, the dynamic adjustments to quality levels or rates can also enable conference supporting resources to be used more effectively. The above-mentioned quality level or rate adjustments can dynamically occur under the control of a requesting user or participant or computer system thereof. In addition, the quality level or rate adjustments can dynamically occur under the control of the conference server, e.g., the conference server 608. For instance in the above described example with respect to FIG. 6, when the computer system B 604 requests 32 kbps audio and 64 kbps video while the computer system C 606 request 64 kbps audio and 64 kbps video, the conference server 608 recognized that it does not need to receive 128 kbps video from the computer system A 602 instead it only need receive 64 kbps. Hence, in such a case, the conference server 608 can request the computer system A 602 to send only 64 kbps video. As a result, resources at the computer system A 602 become available for other purposes and the conference server 608 no longer has to perform rate conversion processing on the video.

Figure 7:
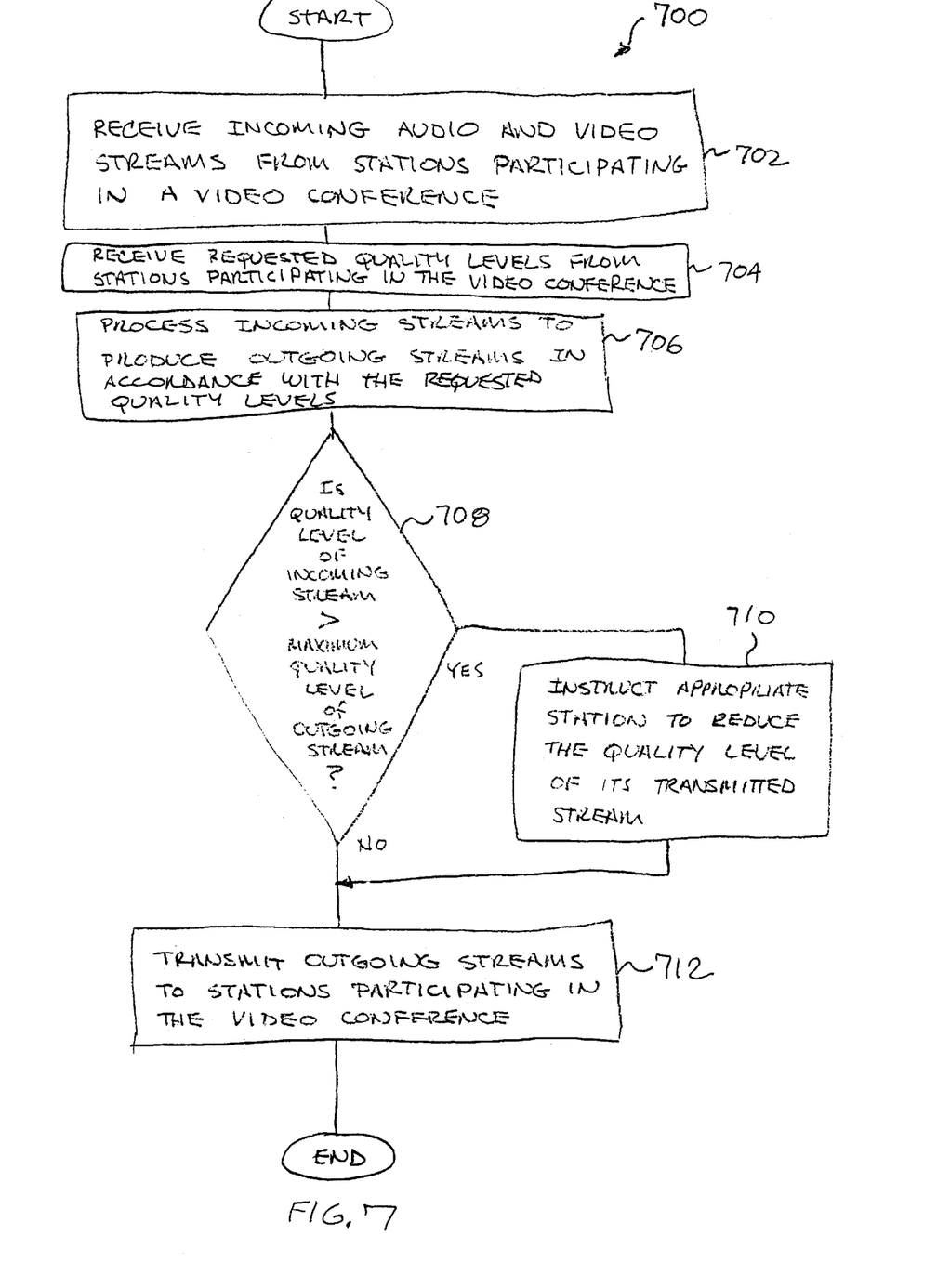
FIG. 7 is a flow diagram of conference server processing according to an embodiment of the invention.

FIG. 7 is a flow diagram of conference server processing 700 according to an embodiment of the invention. The conference server processing 700 is, for example, performed by the multi-party conference system 600 illustrated in FIG. 6. The conference server processing 700 allows stations to adjust the quality level of streams it is to receive while a video conference is ongoing. The conference server processing also allows a conference server to initiate a station to adjust the quality level of streams it transmits.

The conference server processing 700 receives 702 incoming audio and video streams from stations participating in a video conference. These incoming audio and video streams are received by a conference server. Additionally, the conference server receives 704 requested quality levels from the stations participating in the video conference. For example, each station can inform the conference server of an audio quality level and a video quality level is desires to receive. Upon receiving the incoming streams form the stations, the incoming streams are processed 706 by the conference server to produced the outgoing streams. The processing involves rate conversions and possible formatting changes. The processing can also include determining which of the stations has a participant that is actively talking. The selected video to be distributed can, for example, be that stream corresponding to the participant that is actively talking or a reformatting stream that includes a plurality of sub-streams that are presented in different smaller blocks when displayed (Hollywood squares format). The conference server processing 700 also includes a decision block 708 that determines whether the quality level of any of the incoming streams from the stations is greater than the maximum quality level of any of the outgoing streams from the conference server. Of course, the quality levels for audio and video are separately considered. When the decision block 708 determines that one or more of the quality level of the incoming streams do exceed the maximum quality level for the corresponding outgoing stream, then the appropriate one or more stations are instructed 710 by the conference server to reduce the quality level of its transmissions. The reduction of quality level conserves resources at the station. On the other hand, when the decision block 708 determines that none of the quality levels of the incoming streams exceed the maximum quality level for the corresponding outgoing stream, then the block 710 is bypassed. Following block 710 or directly following the decision block when block 710 is bypassed, outgoing streams are transmitted 712 to stations participating in the video conference in accordance with the requested quality levels. Following block 712, the conference server processing is complete and ends. It should be noted that the operations of the conference server are normally happening concurrently in which case, the conference server is receiving streams, processing streams, transmitting streams, and checking for quality level changes, and requesting quality level changes can all occur in a overlapping manner.

The advantages of the invention are numerous. One advantage of the invention is that a participant to a video conference is able to prefer video over audio such that when resources are limited audio quality is sacrificed to preserve video quality. Another advantage of the invention is that a participant to a video conference is able to control the allocation of resources (e.g., bandwidth) to audio, video and perhaps data streams associated with the video conference in a real-time manner while the video conference is in progress.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for providing a video conference, comprising:
   initiating a video conference having an audio quality level and a video quality level, the video conference using resources to provide audio and video between first and second stations coupled together by a network;
   displaying, at the first station, a quality level adjustment tool that allows a participant to adjust at least one of the audio quality level and the video quality level as the video conference is ongoing;
   receiving, from the quality level adjustment tool, an adjustment request to modify at least one of the audio quality level and the video quality level;
   sending the adjustment request from the first station to the second station: and
   thereafter receiving, at the first station from the second station, the audio and video of the video conference such that at least one of the audio quality level and the video quality level has been adjusted in accordance with the adjustment request.

2. A method as recited in claim 1, wherein the network, through which the video conference is provided between the stations, includes a Local Area Network.

3. A method as recited in claim 1, wherein the network, through which the video conference is provided between the stations, includes the Internet.

4. A method as recited in claim 1, wherein the quality level adjustment tool being displayed is a window displayed on a display screen of at least a particular one of the stations.

5. A method as recited in claim 4, wherein the window includes a video level control and an audio level control, the video level control is used to set a new video quality level, and the audio level control is used to set a new audio quality level.

6. A method as recited in claim 5, wherein the new video quality level is a video rate and the new audio quality level is an audio rate.

7. A method as recited in claim 5,
   wherein the video conference is also initiated with a data rate level for the transmission of data between the first and second stations during the video conference, and
   wherein said adjusting operates to adjust at least one of the audio quality level, the video quality level and the data rate level in accordance with the adjustment amount.

8. A method as recited in claim 4, wherein a participant of the station having the window displayed thereon can request quality level adjustment in which video quality is improved while audio quality is degraded, assuming that one of which needs to be degraded due to resource limitations.

9. A method as recited in claim 4, wherein a participant of the station having the window displayed thereon can request quality level adjustment in which audio quality is improved while video quality is degraded, assuming that one of which needs to be degraded due to resource limitations.

10. A method as recited in claim 1,
    wherein the video conference is also initiated with a data rate level for the transmission of data between the first and second stations during the video conference, and
    wherein said adjusting operates to adjust at least one of the audio quality level, the video quality level and the data rate level in accordance with the adjustment amount.

11. A method as recited in claim 1, wherein the quality level adjustment tool permits dynamic control over the audio quality level and the video quality level while the video conference is ongoing.

12. A method as recited in claim 1, wherein the quality level adjustment tool permits incremental control over the audio quality level and the video quality level while the video conference is ongoing.

13. A method as recited in claim 12, wherein the quality level adjustment tool is displayed on a display screen of a particular one of the stations, and the quality level adjustment tool includes a video level control and an audio level control, the video level control is used to set a video quality level, and the audio level control is used to set an audio quality level.

14. A method as recited in claim 13, wherein the new video quality level is a video rate and the new audio quality level is an audio rate.

15. A method for providing a video conference, comprising:
    initiating a video conference having an audio quality level and a video quality level, the video conference providing audio and video between two stations coupled together by a network;
    monitoring, by a computer system, a conference quality level for the video conference as the video conference is ongoing;
    determining, by the computer system, if a loss of quality for the video conference has been detected or anticipated;
    displaying a request for a quality level adjustment when said determining determines that a loss of quality has been detected or anticipated;
    receiving an adjustment request to modify at least one of the audio quality level and the video quality level; and
    adjusting at least one of the audio quality level and the video quality level in accordance with the adjustment amount.

16. A method as recited in claim 15, wherein said monitoring is monitoring resource conditions used in providing the video conference through the network, and
    wherein said determining operates to determine the loss of quality for the video conference based on the resource conditions being monitored.

17. A method as recited in claim 16, wherein the resource conditions being monitored include at least one of processing resources of at least one of the stations, latency of the network, and bandwidth of the network.

18. A method as recited in claim 16, wherein said determining operates to determine the loss of quality for the video conference based on the resource conditions being monitored.

19. A method as recited in claim 18, wherein said determining of the loss of quality comprises:
comparing levels of the monitored resource conditions with thresholds; and
determining the loss of quality for the video conference when at least one of the levels of the monitored resource conditions exceeds the at least one of the thresholds associated therewith.

20. A method as recited in claim 19, wherein the thresholds are set based on prior levels of resource conditions.

21. A method as recited in claim 20, wherein the thresholds represent a predetermined drop in resource conditions from the prior levels of the resource conditions.

22. A method for providing a video conference, comprising:
initiating a video conference having an audio quality level and a video quality level, the video conference using resources to provide audio and video between two stations coupled together by a network;
monitoring available resources for the video conference as the video conference is ongoing;
determining if a reduction of the available resources for the video conference has been detected or anticipated;
displaying a request for a quality level adjustment when said determining determines that a reduction of the available resources has been detected or anticipated;
receiving, in response to the request being displayed, an adjustment request to modify at least one of the audio quality level and the video quality level; and
adjusting at least one of the audio quality level and the video quality level in accordance with the adjustment request.

23. A method as recited in claim 22, wherein the available resources being monitored include at least one of processing, resources of at least one of the station, latency of the network, and bandwidth of the network.

24. A method as recited in claim 22, wherein the request for quality level adjustment being displayed is a window displayed on a display screen of at least a particular one of the stations.

25. A method as recited in claim 24, wherein the window includes a video level control and an audio level control, the video level control is used to set a video quality level, and the audio level control is used to set an audio quality level.

26. A method as recited in claim 22,
wherein the video conference is also initiated with a data rate level for the transmission of data between the two stations during the video conference, and
wherein said adjusting can adjust a data rate level in accordance with the adjustment request.

27. A method as recited in claim 22, wherein said method further comprises:
setting the quality adjustment request to a default request if no adjustment request is received after a predetermined period of time after said displaying of the request for the quality level adjustment.

28. A method as recited in claim 27, wherein said method further comprises:
after receiving the adjustment request, removing the request for quality level adjustment being displayed.

29. A method for providing a video conference using a conference server, said method comprising:
receiving incoming streams of audio and video from stations participating in the video conference, the incoming streams having incoming quality levels;
receiving requested quality levels from the stations participating in the video conference;
processing the incoming streams to produce outgoing streams in accordance with the requested quality levels; and
transmitting the outgoing streams to the stations participating in the video conference,
wherein said receiving of the requested quality levels from the stations can occur dynamically as the video conference is ongoing.

30. A method as recited in claim 29, wherein said method further comprises:
determining whether the incoming quality level of one of the incoming streams from one of the stations exceeds a maximum quality level for the corresponding output stream; and
instructing the one of the stations to reduce the quality level of its corresponding transmitted stream when it is determined that the incoming quality level of one of the incoming streams from one of the stations exceeds the maximum quality level for the corresponding output stream.

31. A computer readable medium including computer program code for providing a video conference, said computer readable medium comprising:
computer program code for initiating a video conference having an audio quality level and a video quality level, the video conference using resources to provide audio and video between first and second stations coupled together by a network;
computer program code for displaying, at the first station, a quality level adjustment tool that allows a participant to adjust at least one of the audio quality level and the video quality level as the video conference is ongoing;
computer program code for receiving, from the quality level adjustment tool, an adjustment request to modify at least one of the audio quality level and the video quality level;
computer program code for sending the adjustment request from the first station to the second station; and
computer program code for thereafter receiving, at the first station from the second station, the audio and video of the video conference such that at least one of the audio quality level and the video quality level has been adjusted in accordance with the adjustment request.

32. A computer readable medium including computer program code for providing a video conference using a conference server, said computer readable medium comprising:
computer program code for receiving incoming streams of audio and video from stations participating in the video conference, the incoming streams having incoming quality levels;
computer program code for receiving requested quality levels from the stations participating in the video conference;
computer program code for processing the incoming streams to produce outgoing streams in accordance with the requested quality levels; and computer program code for transmitting the outgoing streams to the stations participating in the video conference, wherein said receiving of the requested quality levels from the stations can occur dynamically as the video conference is ongoing.

33. A computer readable medium as recited in claim 32, wherein said computer readable medium further comprises:

computer program code for determining whether the incoming quality level of one of the incoming streams from one of the stations exceeds a maximum quality level for the corresponding output stream; and computer program code for instructing the one of the stations to reduce the quality level of its corresponding transmitted stream when it is determined that the incoming quality level of one of the incoming streams from one of the stations exceeds the maximum quality level for the corresponding output streams.

34. A computer system for supporting a video conference with a remote computer system through a network, said computer system comprising:

a camera for receiving local images;

a display for displaying remote images from a remote computer system participating in the video conference;

a microphone for picking up local audio;

a speaker for reproducing remote audio from the remote computer system participating in the video conference; and a conference controller that controls the transmission of the local video and the local audio as well as the reception of the remote video and the remote audio, said video controller operates to (1) initiate the video conference having an audio quality level and a video quality level, (2) display a quality level adjustment tool that allows a participant to adjust at least one of the audio quality level and the video quality level as the video conference is ongoing, (3) receive, from the quality level adjustment tool, an adjustment request to modify at least one of the audio quality level and the video quality level; (4) send the adjustment request to the remote computer system; and thereafter receive the remote audio and remote video of the video conference such that at least one of the audio quality level and the video quality level has been adjusted in accordance with the adjustment request.

35. A computer system as recited in claim 34, wherein the quality level adjustment tool being displayed is a window displayed on a display screen of at least a particular one of the stations, and wherein the window includes a video level control and an audio level control, the video level control is used to set a new video quality level, and the audio level control is used to set a new audio quality level.

36. A computer system as recited in claim 34, wherein the quality level adjustment tool being displayed is a window displayed on a display screen of at least a particular one of the stations, and wherein the window includes an audio-video mixture control that set a resource allocation level between the audio and video which is used in determining the adjustment amount.

* * * * *